F. SAJNO.

Apparatus for Freezing Liquids.

No. 138,941. Patented May 13, 1873.

UNITED STATES PATENT OFFICE.

FRANCESCO SAJNO, OF MILAN, ITALY.

IMPROVEMENT IN APPARATUS FOR FREEZING LIQUIDS.

Specification forming part of Letters Patent No. 138,941, dated May 13, 1873; application filed April 5, 1873.

*To all whom it may concern:*

Be it known that I, FRANCESCO SAJNO, of Milan, in Italy, have invented a new and Improved Apparatus for Freezing Liquids, of which the following is a specification:

My invention is an improvement in the class of apparatus for freezing liquids wherein a horizontally-arranged hollow rotating cylinder is employed; and the improvement relates to so contracting an outer and inner cylinder at the ends, and applying caps thereto, as to effectually prevent leakage; also to providing the said caps with deep cup-shaped flanges, which project beyond the journals, and to providing the outer cylinder with longitudinal plates or partitions, for purposes hereinafter specified.

Figure 1:
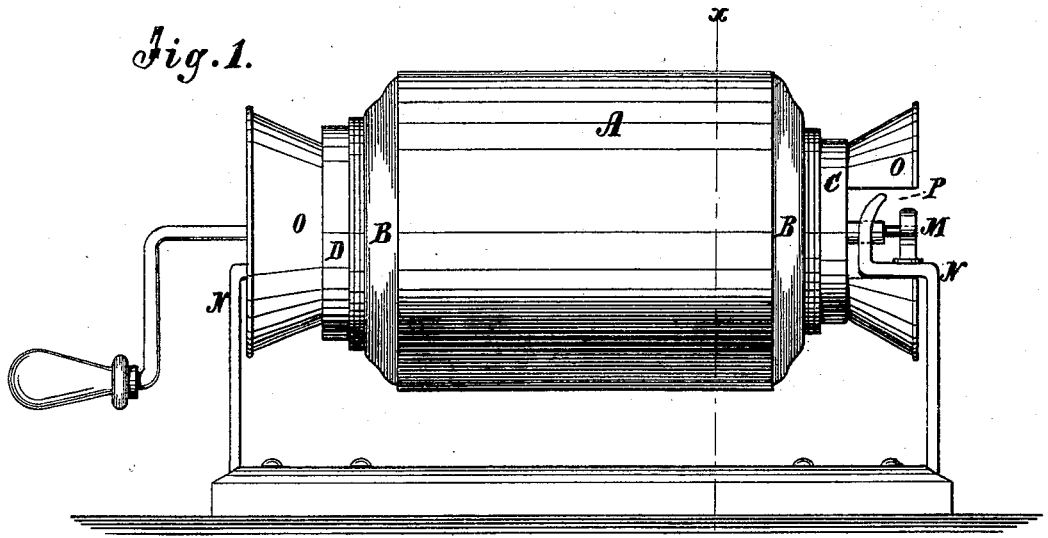
Figure 2:
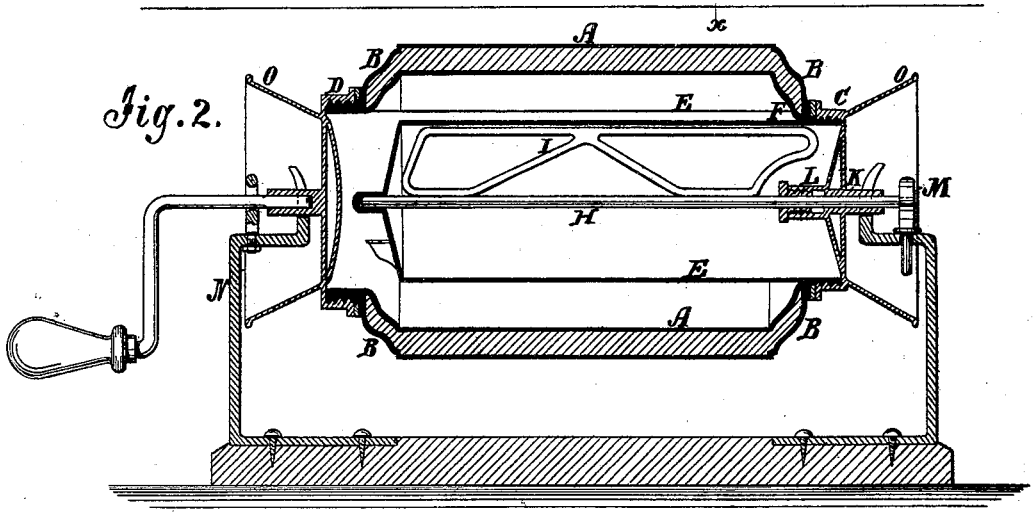
Figure 3:
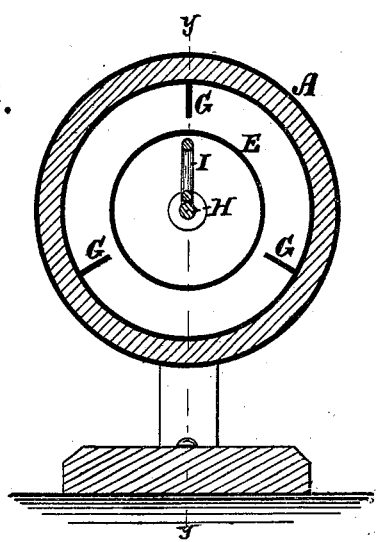

Figure 1 is a side elevation my improved apparatus for freezing liquids. Fig. 2 is a longitudinal sectional elevation taken on the line $x\ x$ of Fig. 1. Fig. 3 is a transverse section taken on the line $y\ y$ of Fig. 1.

Similar letters of reference indicate corresponding parts.

A is the outer cylinder, which, like others for this purpose, is jacketed with a non-conducting material to protect the freezing-mixture from the heat of the atmosphere. B represents the contracted ends, which I provide for the application of the screw-caps C D, which close the openings at the ends so that the water of the freezing-mixture will be held in the space below the joints as the cylinder is revolved, so that it cannot leak out. E is the inner cylinder for holding the liquid to be frozen. It is permanently attached to one end of cylinder A at F, so that the cap C of that end opens and closes the passage to it only; also so that in case the water rises as high in cylinder A as the joint it cannot leak into the liquid to be frozen. G represents the longitudinal plates in cylinder A, dividing the space between it and cylinder E into several compartments to confine the freezing-mixture around cylinder E equally. H represents the stationary rod in the axis of the cylinder E, having the scraper and kneader I on it to scrape the frozen liquid off the surface of E where it freezes before the middle portion, and stir and knead the mass to facilitate the equal and uniform action. This rod extends through the hollow journal K and a gland, L, in the cap C to the post M, to which it is attached, and which is detachably connected to the standard N to hold the rod against turning with the cylinders, and allow it to be removed with the cylinders when taken out of the bearings. O represents the cup-shaped flanges of the caps to form seats for the cylinders to rest on in filling and emptying them. One is notched at P to pass the upper part of the standard N in placing the cylinder in its bearings and removing it.

Having thus described my invention, I claim as new and desire to secure by Letters Patent—

1. The combination of the horizontally-revolving and outer cylinder A, inner cylinder E, and the caps C D, the said cylinder A and caps being arranged as described, to prevent the water from leaking out.

2. The combination of the cup-shaped flanges O with the caps, in the manner described.

3. The combination of the partition G with the cylinders A and E, substantially as specified.

FRANCESCO SAJNO.

Signed in presence of—
PIETRO CENTEMERI,
AU. GIOVANNI SAJNO.